(12) United States Patent
Sekar

(10) Patent No.: US 8,142,599 B2
(45) Date of Patent: Mar. 27, 2012

(54) METHODS FOR MANUFACTURING A PAINT ROLLER AND COMPONENT PARTS THEREOF

(76) Inventor: Chandra Sekar, Searingtown, NY (US)

( * ) Notice: Subject to any disclaimer, the term of this patent is extended or adjusted under 35 U.S.C. 154(b) by 0 days.

(21) Appl. No.: 12/463,876

(22) Filed: May 11, 2009

(65) Prior Publication Data

US 2010/0170629 A1    Jul. 8, 2010

Related U.S. Application Data

(63) Continuation-in-part of application No. 12/350,798, filed on Jan. 8, 2009, now Pat. No. 7,850,812.

(51) Int. Cl.
| | |
|---|---|
| *A46D 1/00* | (2006.01) |
| *B32B 5/00* | (2006.01) |
| *B32B 37/00* | (2006.01) |
| *B32B 38/04* | (2006.01) |
| *D05C 15/00* | (2006.01) |
| *B29C 47/00* | (2006.01) |
| *B29C 65/00* | (2006.01) |
| *B05C 1/00* | (2006.01) |
| *B05C 17/02* | (2006.01) |
| *B44D 5/00* | (2006.01) |

(52) U.S. Cl. ............... 156/271; 156/72; 156/244.11; 15/230.11

(58) Field of Classification Search ............... 156/184, 156/185, 187, 188, 190, 191, 192, 193, 195; 15/230, 230.11; 492/13, 16, 17, 19, 48; 29/895.211
See application file for complete search history.

(56) References Cited

U.S. PATENT DOCUMENTS

| | | |
|---|---|---|
| 1,996,951 A | 10/1931 | Clark et al. |
| 2,842,473 A | 7/1958 | Oberly et al. |
| 3,616,123 A | 10/1971 | Reynolds, Jr. et al. |

(Continued)

FOREIGN PATENT DOCUMENTS

WO   WO-00/44969 A1 *  8/2000

(Continued)

OTHER PUBLICATIONS

International Search Report No. EP 09162028 dated Jul. 28, 2010, 2 pages.

*Primary Examiner* — Philip Tucker
*Assistant Examiner* — Brian R Slawski
(74) *Attorney, Agent, or Firm* — Greenberg Traurig, LLP

(57) ABSTRACT

Described is a method of making a non-porous composite cover material formed of a pile material and an adhesive layer made from polypropylene or predominantly from polypropylene. A width of the pile material is advanced, and a layer of adhesive is applied thereupon. The adhesive is allowed to set, and the width of material is longitudinally cut into strips of composite cover material. Laminated paint rollers are thereafter made by helically one or two strips of polypropylene or strips made predominantly of polypropylene about a mandrel and applying a layer of adhesive made from polypropylene or predominantly from polypropylene on the strip or strips, and applying a non-porous composite cover material. A compressive force is applied upon the outer surface of the composite cover material to urge the composite cover material, the layer of adhesive and strip or strips of thermoplastic material together against the mandrel, thereby laminating the inner surface of the composite cover material and the strip or strips together and forming a continuous product that can be cut and finished to make paint rollers.

7 Claims, 14 Drawing Sheets

U.S. PATENT DOCUMENTS

| | | | |
|---|---|---|---|
| 4,113,546 A | 9/1978 | Anders | |
| 4,657,049 A | 4/1987 | Fourty et al. | |
| 4,663,103 A | 5/1987 | McCullough et al. | |
| 4,729,807 A | 3/1988 | Hede et al. | |
| 5,855,715 A * | 1/1999 | Langford et al. | 156/187 |
| 6,145,196 A | 11/2000 | Ripstein | |
| 6,159,134 A * | 12/2000 | Sekar | 492/13 |
| 6,241,840 B1 | 6/2001 | Pratt et al. | |
| 6,291,024 B1 | 9/2001 | Deroch et al. | |
| 6,409,645 B1 | 6/2002 | Paasonen et al. | |
| 6,488,802 B1 | 12/2002 | Levingston et al. | |
| 6,615,490 B2 * | 9/2003 | Polzin | 29/895.211 |
| 6,983,540 B2 | 1/2006 | Kato et al. | |
| 2002/0066521 A1 | 6/2002 | Sekar | |
| 2002/0077234 A1 | 6/2002 | Sekar | |
| 2002/0112810 A1 * | 8/2002 | Polzin et al. | 156/188 |
| 2004/0166256 A1 | 8/2004 | Pierce | |
| 2007/0135008 A1 | 6/2007 | Hall et al. | |
| 2008/0187696 A1 | 8/2008 | Bock et al. | |
| 2008/0257482 A1 | 10/2008 | Jeruzal et al. | |
| 2009/0321007 A1 | 12/2009 | Sekar | |

FOREIGN PATENT DOCUMENTS

| | | | |
|---|---|---|---|
| WO | WO 00/44969 A1 * | 8/2000 | |

* cited by examiner

METHODS FOR MANUFACTURING A PAINT ROLLER AND COMPONENT PARTS THEREOF

This application is a continuation-in-part of U.S. patent application Ser. No. 12/350,798 filed Jan. 8, 2009, now U.S. Pat. No. 7,850,812.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This invention pertains to methods and apparatuses for making paint rollers of the type used for applying paint to walls and the like. More specifically, the invention pertains to methods and apparatus for making a composite cover material for use in a paint roller manufacturing process, and to making paint rollers that are formed in a continuous process from one or more strips and a composite cover material.

BRIEF DESCRIPTION OF THE DRAWINGS

In the accompanying drawings forming a part of this specification, and in which like reference characters are employed to designate like parts throughout the same.

DETAILED DESCRIPTION OF THE INVENTION AND THE PREFERRED EMBODIMENTS

Figure 1:
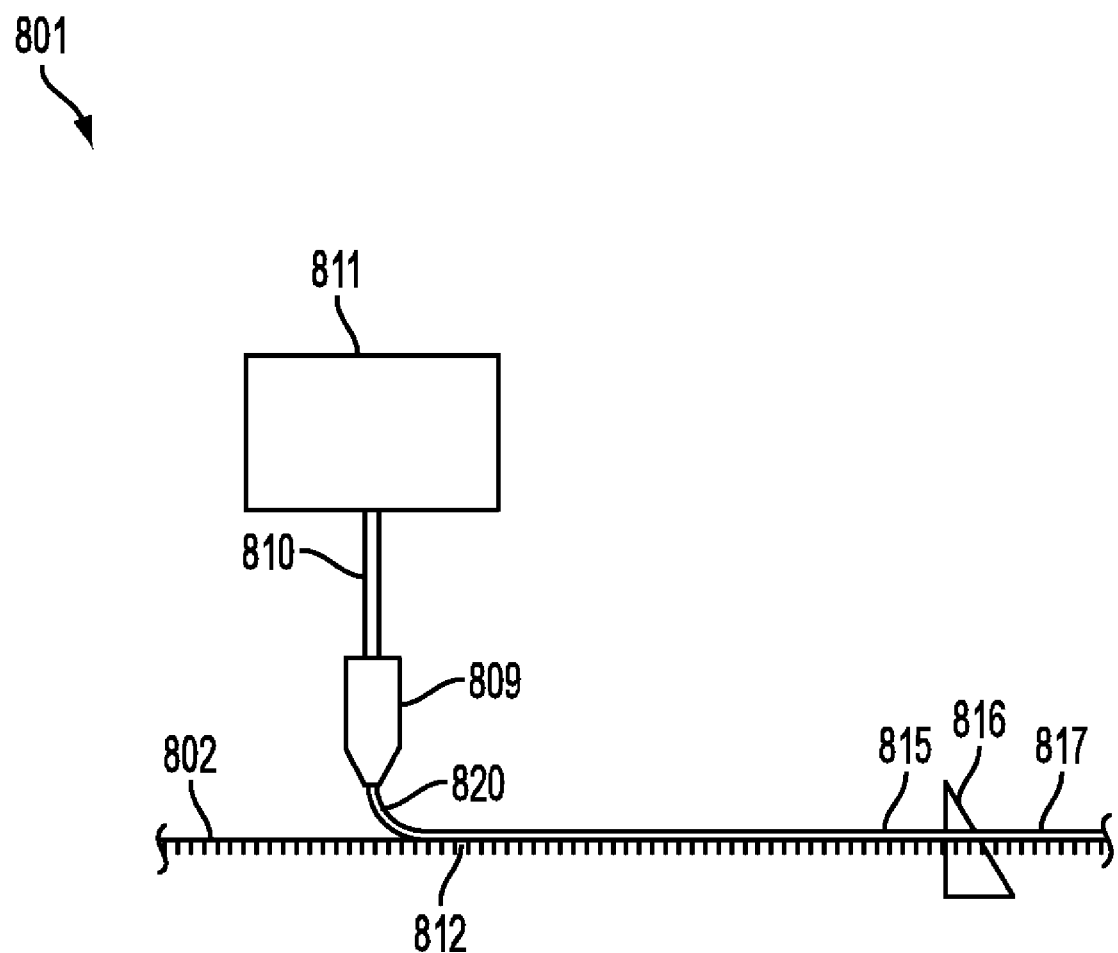
FIG. 1 is a side view diagrammatic representation of an apparatus for making composite cover material in accordance with an embodiment of the present invention.

FIG. 1 shows an apparatus 801 for forming composite cover material 817. In an embodiment, the apparatus comprises an adhesive applicator 809 that receives a supply of adhesive from an adhesive supply 811 via a feeder 810, and a strip cutter 816.

The composite cover material 817 is formed using a supply of pile material 802 such as would be suitable for use manufacturing a paint roller cover. The composite cover material is formed using a continuous supply of pile material such as would be suitable for use manufacturing a paint roller cover. Suitable pile material 802 may be used such as the material that can be manufactured using a sliver knitting machine such as the SK-18 available from Mayer Industries Inc. Such knitted pile material may be made "in the round," and slit for use as a continuous pile material. Once slit, the knitted pile material can be laid flat for further processing. As an alternative to the knitted pile material, a woven pile material may be used, such a woven pile material, while generally more expensive than the knitted material, is advantageous as its fibers are better locked in during the weaving process rather than by later application of an adhesive. The knitted or woven pile material 2 is usually sheared (not shown) on the pile side to attain a desired pile height. As an alternative to woven or knitted materials, a microfiber material may be used. The material 2 can have any usable width, such as widths of approximately 32" or 60", and can be manufactured or sheared to a desired pile height. The material 802 can have any usable width, for example, a width of approximately 32" or 60". In an embodiment, the material has a pile side (shown facing downwards) and a fabric side (shown facing upwards).

In an embodiment, the material 802 is laid flat with its pile side down and moved towards an adhesive layer 802 being dispensed from the adhesive applicator 809. A tenter (not shown), also known as a tenter frame, or a similar apparatus may be used to advance the material 802. In an embodiment, the material 802 is moved in a generally horizontal direction with the pile side down.

An adhesive layer 820 is dispensed from the adhesive applicator 809 onto the fabric backing of the material 802. The adhesive supply 811 supplies the adhesive to the applicator 809 via a feeder 810. In an embodiment, the adhesive is made predominantly or entirely from polypropylene resin, the adhesive applicator 809 may be a die head and the supply 811 and feeder 810 are parts of an extruder suitable for use to extrude polypropylene resin into the adhesive layer 820. After the adhesive layer 820 has been applied to the fabric backing of the material 802 they are allowed to set and/or bond together. The setting of the adhesive layer and/or the bonding between the adhesive layer 820 and the fabric backing of material 802 may be affected by control of the environment (e.g., the application of heating or cooling, or otherwise) after the adhesive 820 is dispensed from the applicator 809 but before it has set fully. It is within the scope of the invention to permit the setting of the adhesive layer 820 and its bonding to the material 802 through the use of environmental intervention and/or mechanical intervention.

In an embodiment, a polypropylene adhesive layer 820 is applied to the fabric backing of the material 802 in a molten, or at least partially liquefied state. For the purpose of this document, the term polypropylene is not intended to require that the adhesive, strip or other material be made solely of polypropylene, that it is made predominantly from polypropylene, and may contain some or a substantial portion of additives as may be desirable. In an embodiment, after its application to the fabric backing of the material 802, the molten polypropylene adhesive layer 802 fill interstitial spaces or gaps within the fabric backing of the material 802 before setting, thus integrating the adhesive layer 820 with the material 802, and forming a composite sheet material 815. The thusly formed composite sheet material 815 is stiffer than the material 802 absent the integrated materials from the adhesive layer. In an embodiment, the fibers of the of the composite sheet material 815 are locked in place by the integrated materials from the adhesive layer.

After its application to the fabric backing of the material 802, the molten polypropylene adhesive layer 802 can set with an even or smooth the exposed surface as it forms the composite sheet material 815 with a generally uniform non-porous backing.

The composite sheet material 815 is advanced across cutter 816 to form composite cover material 817. The cutter 816 may be used to cut the composite sheet material 815 into strips of composite cover material 817 in a desired width. The strips of composite sheet material 815 do not need to be cut to equal widths. It is within the scope of this invention to cut differing width composite cover material 817 from a single composite sheet material 815, for example, by varying the spacing of the cutting edges of the cutter 816.

In an embodiment, the strips of composite cover material 817 each have a width of approximately 2⅞ inches, corresponding to a width of cover material that may typically be used to manufacture paint rollers. The composite cover material 817 may be spooled and cut such that it can be transported for use at another site or on another machine performing a continuous manufacturing process for laminated paint rollers. In another embodiment, the composite cover material may be feed directly to an apparatus that uses the material in forming laminated paint rollers. Where the composite cover material is spooled, it may be desirable to spool the composite cover material 817 while it is still warm and pliable, alternatively, it may be desirable to ensure that the composite cover material 817 is fully cooled (i.e., not warm and pliable) when it is spooled.

If the pile on material 802 had not been sheared to the desired height prior to the application of the adhesive layer 820, the composite sheet material 815, or the composite cover material 817 may be cut by a pile cutter (not shown). The additional rigidity of the composite sheet material 815 or composite cover material 817 (as compared to the material 802) may make the process of shearing to a desired pile height easier.

Figure 2:
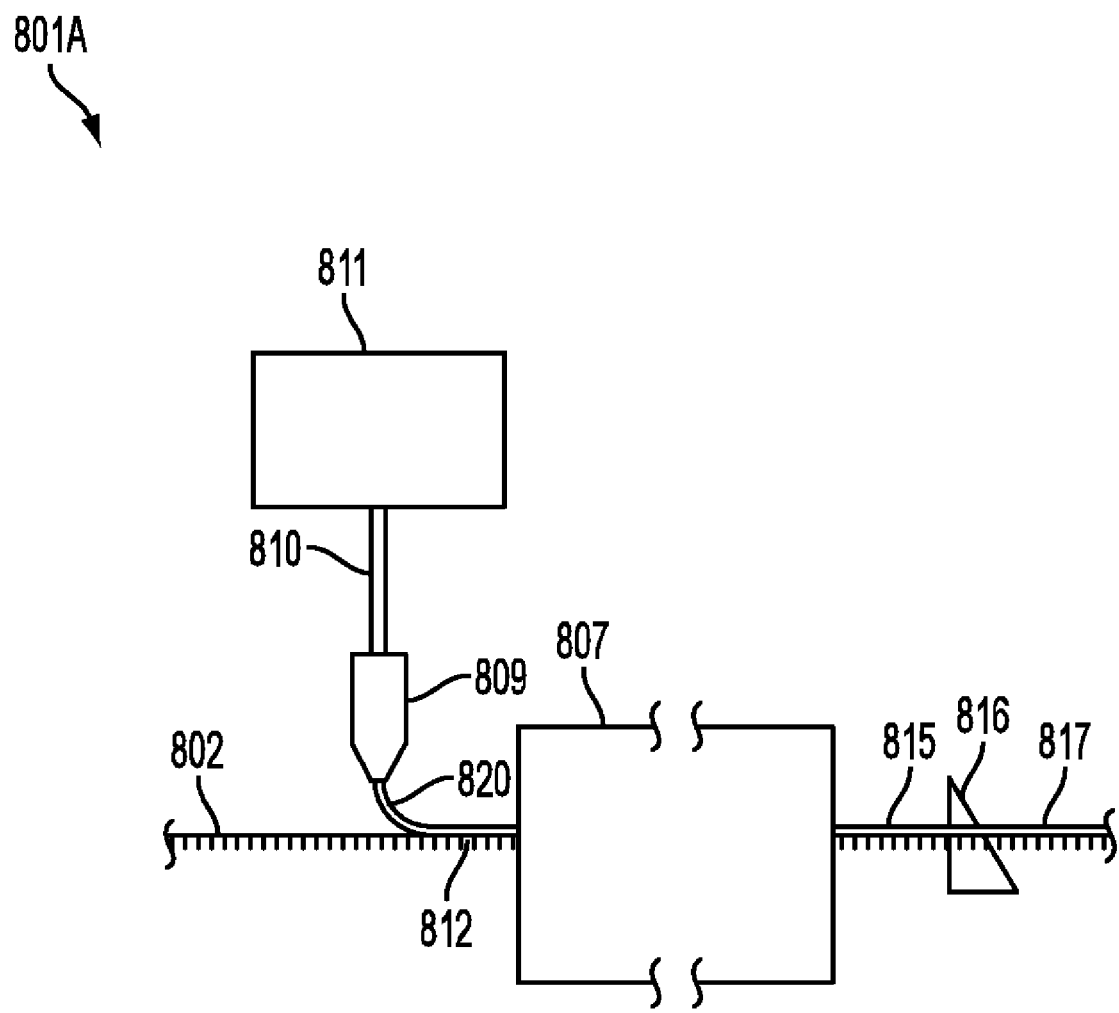
FIG. 2 is a side view diagrammatic representation of another apparatus for making composite cover material in accordance with an embodiment of the present invention.

FIG. 2 shows an apparatus 801A for forming composite cover material 817. In an embodiment, the apparatus comprises an adhesive applicator 809, an environmental control 807 and a strip cutter 816. The adhesive applicator 809 receives a supply of adhesive from an adhesive supply 811 via a feeder 810.

Composite cover material 817 is formed using a supply of pile material 802 such as would be suitable for use manufacturing a paint roller cover. Pile material 802 is a type suitable for use as a paint roller, and in an embodiment may be knitted or woven material. The material 802 can have any usable width, for example, a width of approximately 32 inches, or of approximately 60 inches. In an embodiment, the material has a pile side (shown facing upwards) and a fabric side (shown facing downwards).

In an embodiment, the material 802 is laid flat with its pile side down and moved towards an adhesive layer 802 being dispensed from the adhesive applicator 809. A tenter (not shown) or a similar apparatus may be used to advance the material 802. In an embodiment, the material 802 is moved in a generally horizontal direction with the pile side down.

An adhesive layer 820 is dispensed from the adhesive applicator 809 onto the fabric backing of the material 802. The adhesive supply 811 supplies the adhesive to the applicator 809 via a feeder 810. In an embodiment, the adhesive is made predominantly or entirely from polypropylene resin, the adhesive applicator 809 may be a die head and the supply 811 and feeder 810 are parts of an extruder suitable for use to extrude polypropylene resin into the adhesive layer 820. Once the adhesive layer 820 has been applied to the fabric backing of the material 802 they are allowed to set and/or bond together.

The setting of the adhesive layer and/or the bonding between the adhesive layer 820 and the fabric backing of material 802 may be affected by control of the environment (e.g., the application of heating or cooling, or otherwise) after the adhesive 820 is dispensed from the applicator 809 but before it has set fully. It is within the scope of the invention to permit the setting of the adhesive layer 820 and its bonding to the material 802 through the use of environmental intervention.

In an embodiment, after the application of the adhesive layer 820 the material 812 can be fed through an environmental control 807 as it forms the composite sheet material 815. The environmental control 807 may be used to affect the bond, or the quality or completeness of the bond, between the adhesive layer 820 to the underlying material 802, and aid in integrating the adhesive layer 820 with the material 802.

In an embodiment using an environmental control 807, the control 807 may employ the application of heat, which may even or smooth the exposed surface of the adhesive layer 820.

In an embodiment using an environmental control 807, the control 807 may employ the application of heat, which may permit the adhesive in the adhesive layer 820 to better fill interstitial spaces or gaps within the material 802.

In an embodiment using an environmental control 807, the control 807 may employ the application of heat, which may allow more contact between the adhesive in the adhesive layer and the fibers making up the pile in the material 802, thereby locking fibers in place in the pile as it sets.

In an embodiment using an environmental control 807, the control 807 may employ the application of heat, which can provide the ability to control the speed at which the adhesive sets and creates the composite sheet material 815.

In another embodiment using an environmental control 807, the control 807 may employ cooling, such cooling can hasten the hardening or setting of the adhesive layer 820.

It is within the scope of the invention to employ an environmental control 807 that utilizes both the application of heat and the application of cold, seriatim, in any order, and without limitation on the number of applications or the temperature of a specific application. Using heat, cooling, multiple applications of heat or cooling, or combinations of both heat and cooling may achieve, among other things, one or more of the following: (i) evening or smoothing the exposed surface of the adhesive layer 820 to provide a generally uniform non-porous backing; (ii) permitting the adhesive in the adhesive layer 820 to better fill interstitial spaces or gaps within the material 802; and/or (iii) allowing more contact between the adhesive in the adhesive layer and the fibers making up the pile in the material 802; (iv) locking fibers in the pile in place as the adhesive sets; and/or (v) hasten or lengthening the hardening or setting of the adhesive layer 820.

Whether or not an environmental control 807 is employed, the composite sheet material 815 is advanced across cutter 816 to form composite cover material 817. As discussed above, the cutter 816 may be used to cut the composite sheet material 815 into strips of composite cover material 817 in a desired width. The strips of composite sheet material 815 do not need to be cut to equal widths. It is within the scope of this invention to cut differing width composite cover material 817 from a single composite sheet material 815, for example, by varying the spacing of the cutting edges of the cutter 816.

In an embodiment, the strips of composite cover material 817 each have a width of approximately 2⅞ inches, corresponding to a width of cover material that may typically be used to manufacture paint rollers. As discussed above, composite cover material 817 may be spooled and cut for transport, or feed directly to an apparatus that uses the material in forming laminated paint rollers. The composite cover material 817 may be spooled while it is still warm and pliable, or after it is fully cooled.

If the pile on material 802 has not been sheared to the desired height prior to the application of the adhesive layer 820, a pile cutter (not shown) can be use to shear the composite sheet material 815 or the composite cover material 817.

Figure 3:
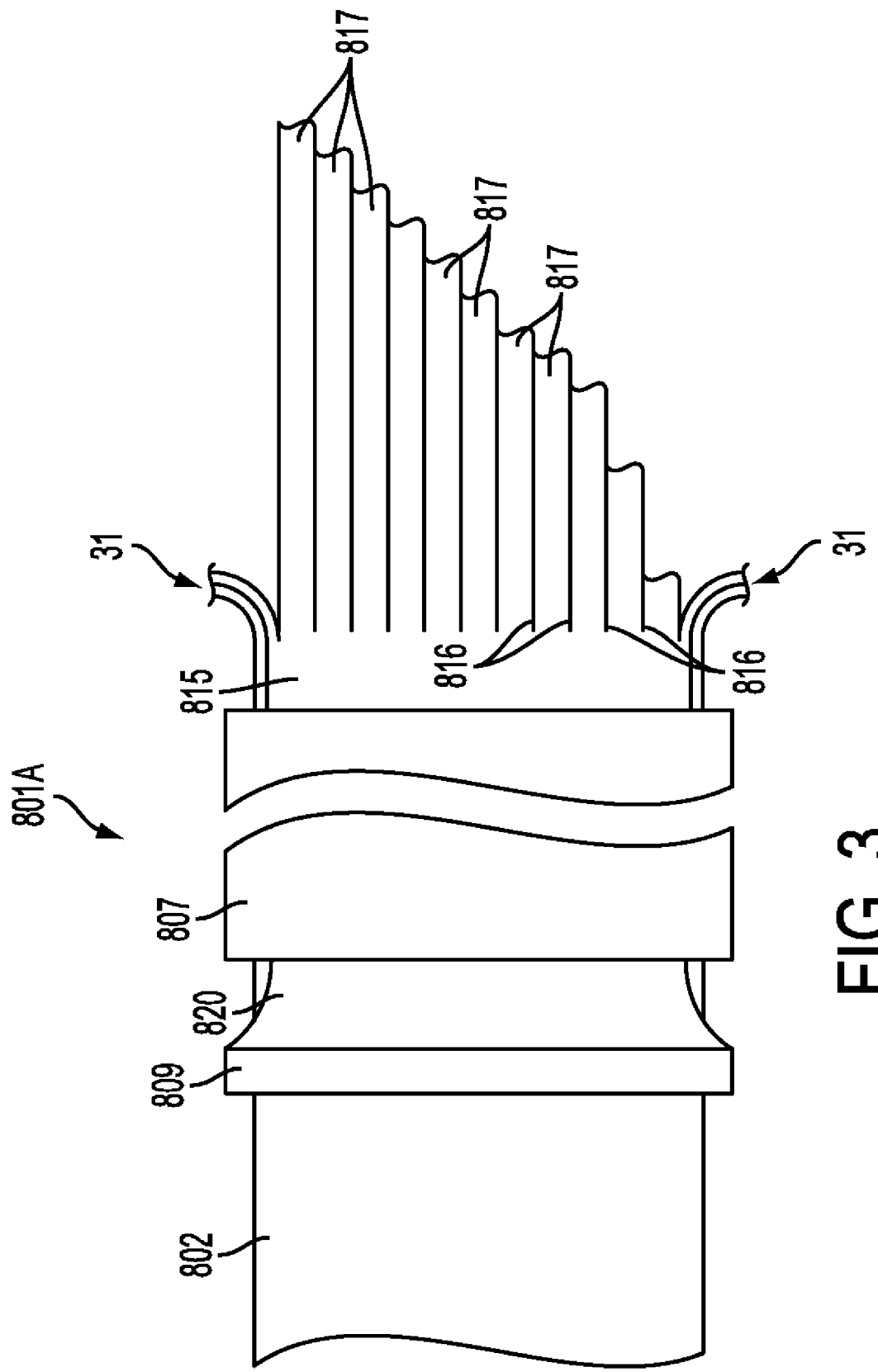
FIG. 3 is a diagrammatic top view of the apparatus for making composite cover material of FIG. 2.

FIG. 3 shows a top view is shown of an apparatus 801A for manufacturing the composite cover material 817 in accordance with an embodiment of the invention. The adhesive applicator 809 applies an adhesive layer 820 to the material 802 as the material is advanced. In an embodiment, the material 802 may be fed into the apparatus 801A directly as it is manufactured, or from pre-manufactured lengths.

In the embodiment shown in FIG. 3, the fabric-backed pile material 802 approximately 32" wide is advanced. A polypropylene adhesive layer 820, which starts wider at the applicator 809 is narrowed as it is pulled along by the advancing material 802. Where the adhesive layer 820 makes contact with the material 802, it may be between 31⅝" and 32". The adhesive layer 802 and advancing material 802 passed through environmental control 807. Smooth composite sheet material 815 emerges from the environmental control 807 and is separated into eleven strips of composite cover material 817, each being 2⅞" wide. Twelve separate blades can be used in the cutter 816 to form the eleven strips of 2⅞" each, and two small waste strips 31.

Varying the width of the material 802 is within the scope of the invention, thus, in another embodiment, the material 802 can be approximately 60" wide, and narrowed width of the adhesive layer 820 where it contacts the material 802 is between 57.5" and 60" wide. Using this configuration, and twenty-one blades for cutter 16, twenty strips of 2⅞" composite cover material can be made. As above, two small waste strips 31 will result.

While only two different examples are presented, any desired width of material 802 may be used. Where the adhesive layer 820 comprises polypropylene, and where the applicator 809 is an extruder, one limiting factor on the width of the material 802 used is the capabilities of the extruder. It is, however, within the scope of the invention to use multiple extruders to apply multiple, non-overlapping adhesive layers 802 on the material 802.

Figure 4:
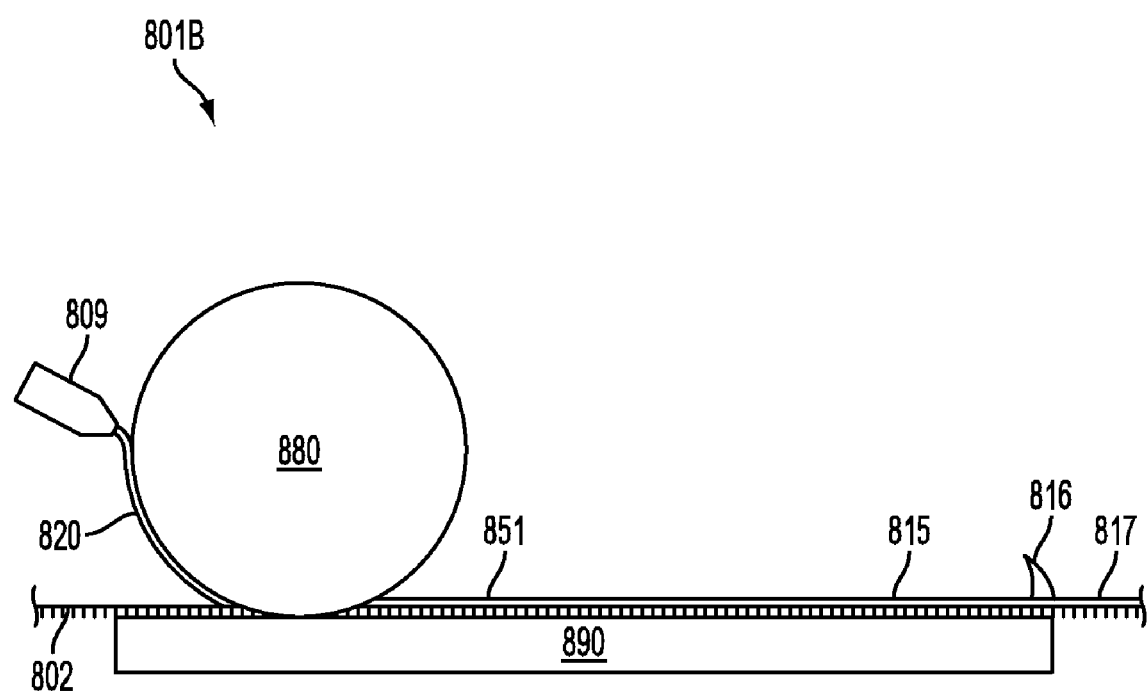
FIG. 4 is a side view diagrammatic representation of yet another apparatus for making composite cover material in accordance with an embodiment of the present invention.

FIG. 4 shows an apparatus 801B for forming the composite cover material 817. In an embodiment, the apparatus comprises an adhesive applicator 809 fed from a feeder (not shown) which gets a supply of adhesive from an adhesive supply (not shown). An advancing material 802 is deposited by an applicator 809 onto a roller 880, and runs between the roller 880 and a frame 890 having a flat portion. The roller 880 may be urged toward the frame 890 by a spring, by gravity or by other means that will be apparent to persons skilled in the art.

Composite cover material 817 is formed using a supply of pile material 802 such as would be suitable for use manufacturing a paint roller cover. The material 802 is a type suitable for use as a paint roller, and in an embodiment may be knitted or woven material. The material 802 can have any usable width, for example, a width of approximately 32 inches, or of approximately 60 inches. In an embodiment, the material has a pile side (shown facing upwards) and a fabric side (shown facing downwards).

In an embodiment, the material 802 is supported by a frame 809 such as a tenter frame with its pile side down, and moved towards the roller; an adhesive layer 820 is dispensed from the adhesive applicator 809. The frame or a similar apparatus may be used to advance the material 802. The adhesive layer may be any operable thickness. In an embodiment, the adhesive layer 820 is between 0.010' and 0.020" in thickness.

Once the adhesive layer 820 dispensed from the applicator 809 contacts the roller 880, it travels along on the outside of the roller until it is sandwiched between the roller 880 and the material 802. The positioning and angular orientation of the applicator 809 may be varied. In an embodiment, the applicator is angled between 30 degrees and 60 degrees from vertical and positioned within inches of the middle of the roller 880. In another embodiment the applicator 809 is within 30 degrees (+/−) of vertical, and is positioned to dispense adhesive such that the adhesive layer 820 first makes contact on the upper half of the roller 880. In yet another embodiment, the applicator 809 is within 30 degrees (+/−) of horizontal and is positioned to dispense adhesive such that the adhesive layer 820 first makes contact on the lower half of the roller 880. Variations in the angular orientation of the applicator 809, and its distance from and orientation around the roller are within the scope of the invention, and will be apparent to one skilled in the art.

In an embodiment, the adhesive is made predominantly or entirely from polypropylene resin and the adhesive applicator 809 may be a die head that is part of an extruder suitable for use to extrude polypropylene resin into the adhesive layer 820. In such an embodiment, the adhesive has a viscosity as it exits the extruder in the form of a sheet of molten polypropylene. The applicator 809 may be placed relatively close to the location where the adhesive layer 802 contacts the roller 880 (as shown); alternatively, in an embodiment, the applicator 809 may be placed farther away, or at another location where the adhesive layer 820 contacts the roller 880 sooner before it contacts the material 802, or after it contacts the material 802. Such variation is within the scope of this invention, and will be apparent to a person of skill in the art.

As the material 802 and the adhesive layer 820 pass between the roller 880 and the surface of the frame 890 they are urged together. The top or roller-side of the adhesive layer 820 may be smoothed or uniformly imprinted (e.g., embossed) as it passed underneath the roller 880 forming a uniform or smooth adhesive layer surface 851. The compressive force of the roller 880 may be sufficient to force adhesive into the interstitial spaces or gaps in the fabric backing of the material 802. The resulting composite sheet material 815 may be cut by cutter 816 to form the composite cover material 817 with a non-porous backing.

The roller 880 may be heated. Heating of the roller 880 may aid in the penetration of the adhesive layer 820 into the interstitial spaces or gaps within the material 802 as the adhesive layer 820 passes beneath the roller 880.

The roller 880 may be cooled. Cooling of the roller 880 may hasten the setting of the adhesive layer 820 or of the uniform or smooth adhesive layer surface 851, or both. Hastening the setting of the uniform or smooth adhesive layer surface 851 may yield a crisper imprint or a smoother surface thereon. Even if the roller 880 is cooled, the compressive force of the roller 880 may be sufficient to force adhesive into the interstitial spaces or gaps in the fabric backing of the material 802. Thus, a cooled roller may provide one or more of the following benefits: providing a smoother or crisper surface 851; hastening the setting of the adhesive, and thus the forming of the composite sheet material 815; improving the contact between the material 802 and the adhesive used to form the adhesive layer 820; and holding in place of the fibers comprising the pile of the material 802.

The roller 880 may also be operated at ambient temperature, and neither heated nor cooled. In an embodiment, the roller 880 is of a diameter that will allow it to adequately smooth or uniformly imprint the adhesive layer 820 to form the smoothed or uniform adhesive layer 851. In an embodiment, the roller 880 has a diameter between about 14" and 20".

Figure 5A:
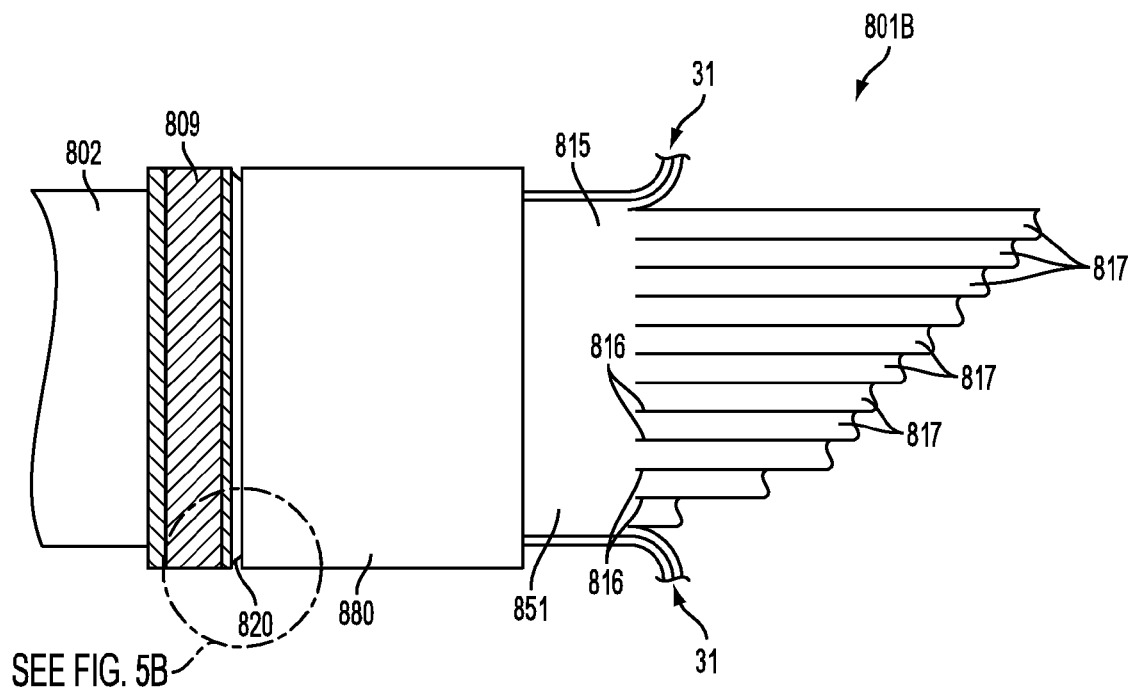
FIG. 5 is a diagrammatic top view of the apparatus for making composite cover material of FIG. 4.
Figure 5B:
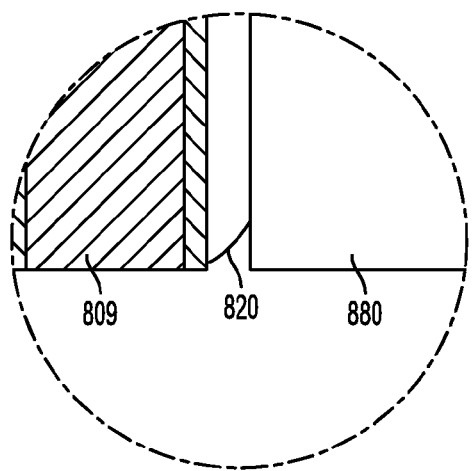

FIG. 5 shows a top view of the apparatus 801B. The material 802 advances across frame 890 (not shown). The applicator 809 dispenses an adhesive layer (not show) on the upper surface of the material 802. The material 802 with the adhesive layer thereupon are passed beneath a roller 880 which imparts a compressive force thereupon. The top or roller-side of the adhesive layer 820 may be smoothed or uniformly imprinted as it passed underneath the roller 880 forming a uniform or smooth adhesive layer surface 851 while the compressive force of the roller 880 may be sufficient to force adhesive into the interstitial spaces or gaps in the fabric backing of the material 802. The resulting composite sheet material 815 may be cut by cutter 816 to form the composite cover material 817 with a non-porous backing.

Figure 6:
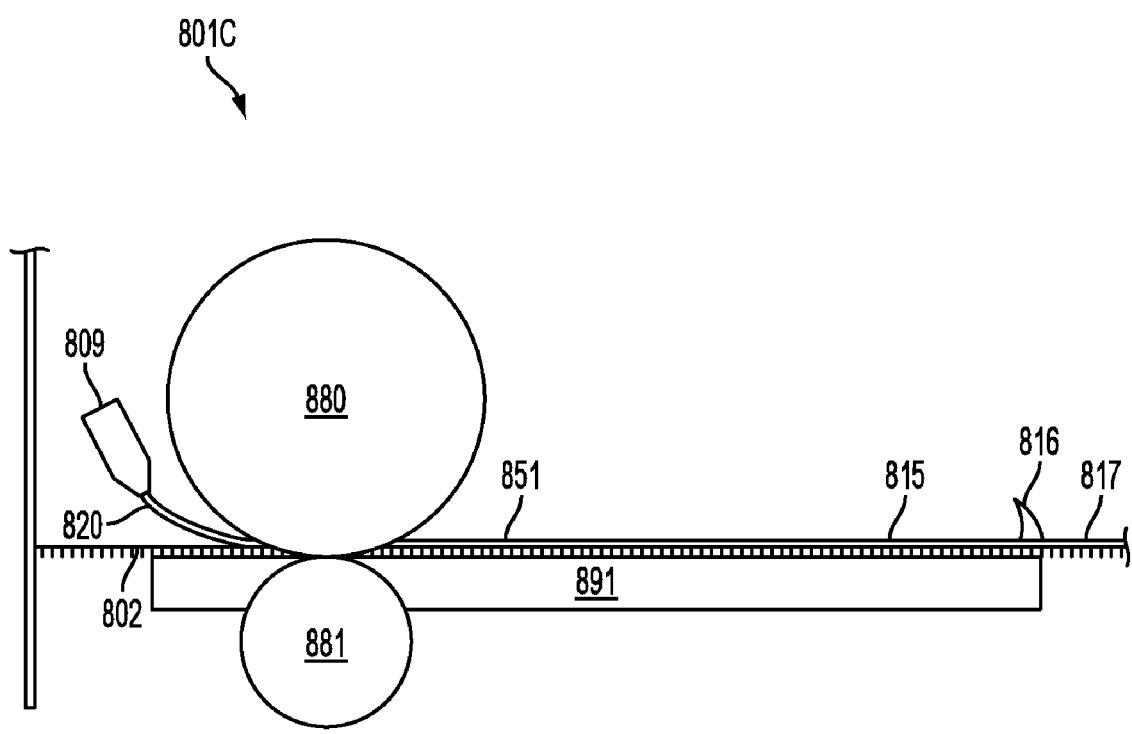
FIG. 6 is a side view diagrammatic representation of still another apparatus for making composite cover material in accordance with an embodiment of the present invention.

FIG. 6 shows an apparatus 801C that is a variation on the apparatus 801B shown in FIGS. 4 and 5. More specifically, apparatus 801 additionally includes roller 881, that acts, together with roller 881, to impart a compressive force between the material 802 and the adhesive layer 820. The roller is shown in a modified frame 891 that allows for the rollers 880, 881 to act together rollers as the material 802 and adhesive layer 820 pass beneath the upper roller 880.

As discussed above with respect to the roller 880, the roller 881 can be heated or cooled. It is thus possible to simultaneously heat or cool the rollers 880, 881. It is also possible to heat or cool one of the rollers, or to heat one of the rollers, while cooling the other.

In an embodiment, the upper roller 880 is cooled while the lower roller 881 is heated. Cooling the upper roller 880 may provide one or more of the following benefits: providing a smoother or crisper surface 851; hastening the setting of the adhesive, and thus the forming of the composite sheet material 815; improving the contact between the material 802 and the adhesive used to form the adhesive layer 820; and holding in place of the fibers comprising the pile of the material 802. While heating the lower roller 881 may aid in the penetration of the adhesive layer 820 into the interstitial spaces or gaps within the material 802 as the adhesive layer 820 passes above the roller 881.

Either or both of the rollers may also be operated at ambient temperature, and neither heated nor cooled.

Moreover, it is not necessary to modify the frame 890 shown in FIG. 4 to be like the frame 891 shown in FIG. 6 to operate rollers 880, 881 in order to keep within the scope of the present invention. As will be apparent to one of skill in the art, the rollers 880, 881 can be configured to be prior to, or after, an unmodified frame 890. The applicator 809 can be moved accordingly.

The rollers 880, 881 may be the same size, or of differing sizes. In an embodiment, the upper roller 880 is of a diameter that will allow it to adequately smooth or uniformly imprint the adhesive layer 820 to form the smoothed or uniform adhesive layer 851. In an embodiment, the upper roller 880 has a diameter between about 14" and 20". In an embodiment, the lower roller 881 is of a diameter that will permit it to operate with the upper roller 880. In an embodiment, the lower roller 880 has a diameter between about 5" and 20".

In an embodiment, instead of using a tenter to move the material, the rollers 880, 881 can drive the material therebetween.

Figure 7:
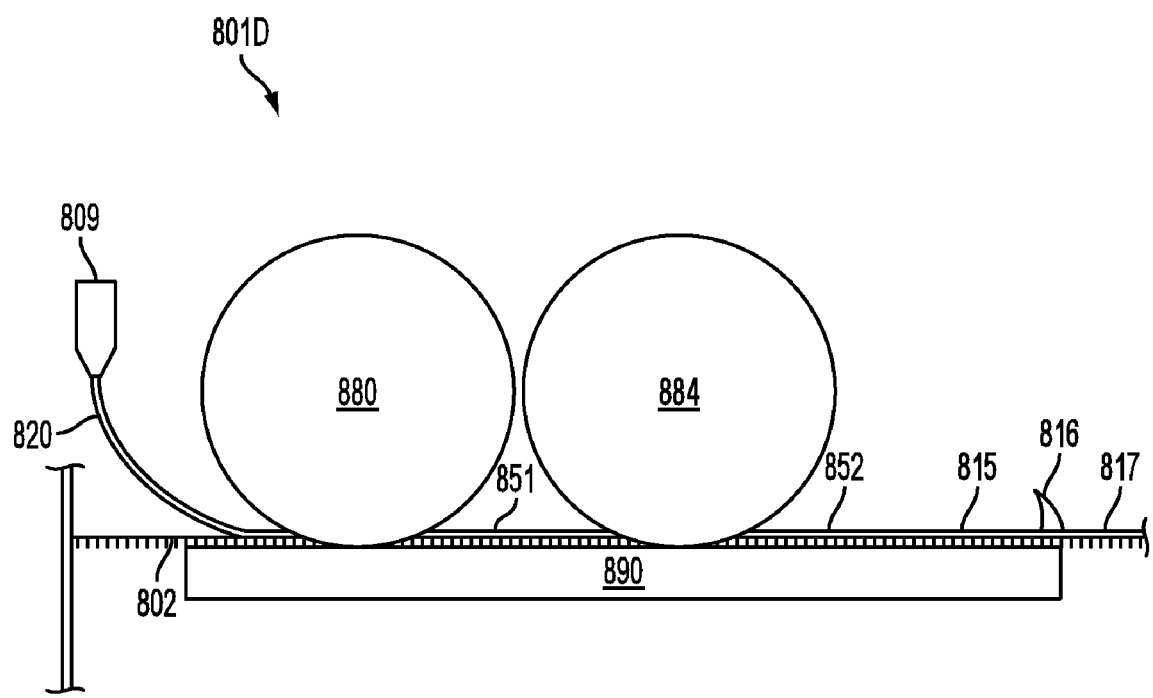
FIG. 7 is a side view diagrammatic representation of a further apparatus for making composite cover material in accordance with an embodiment of the present invention.

Turning now to FIG. 7, an apparatus 801D for forming the composite cover material 817 is shown. In an embodiment, the apparatus comprises an adhesive applicator 809 fed from a feeder (not shown) which gets a supply of adhesive from an adhesive supply (not shown). An advancing material 802 runs between a roller 880 and a surface 890 such as a flat portion of a tenter frame. The roller 880 may be urged toward the surface 890 by a spring, by gravity or by other means that will be apparent to persons skilled in the art.

An adhesive layer 820 leaves the applicator 809 and is sandwiched between the roller 880 and the material 802 prior to, or as the material passes beneath the roller 880. In an embodiment, the adhesive forming the adhesive layer 820 is predominantly polypropylene. The positioning of the applicator 809 may be varied. Where the adhesive forming the adhesive layer 820 is polypropylene, the applicator 809 may be the die head of an extruder. In such an embodiment, the adhesive has a viscosity as it exits the extruder that forms a sheet of molten polypropylene. In an embodiment, the applicator 809 may be placed at a distance to the location where the adhesive layer contacts the material 802 prior to contacting the roller 880 (as shown) or at substantially the same time it contacts the roller 880; or at another location, including where the adhesive layer 820 contacts the roller 880 before it contacts the material 802. Such variation is within the scope of this invention, and will be apparent to a person of skill in the art.

As the material 802 and the adhesive layer 820 pass between the roller 880 and the surface 890 they are urged together. The top or roller-side of the adhesive layer 820 is smoothed or uniformly imprinted as it passed underneath the roller 880 forming a uniform or smooth adhesive layer 851, while the contact between the adhesive and the material 802 under pressure from the roller 880 permits the adhesive layer 820 to fill interstitial spaces or gaps within the material 802. The material 802 and the uniform or smooth adhesive layer 851 may then be passed beneath a second roller 881 to form the resulting composite sheet material 815.

After the material 802 with the applied adhesive layer 820 pass between the roller 880 and the surface 890 forming the uniform or smooth adhesive layer 851, the combination is then passed beneath a second roller 884. As with the first roller 880, when the combination passes beneath the second roller 884 it is again urged together. The second roller 884 may also smooth or imprint the uniform or smooth adhesive layer 851, and in any event, will impart downward pressure upon it, which may permit the adhesive layer 820 to further fill interstitial spaces or gaps within the material 802. The resulting composite sheet material 815 may be cut by cutter 816 to form the composite cover material 817 with a non-porous backing.

One or both of the rollers 880, 884 may be heated or cooled, or one may be heated while the other is cooled.

Cooling one or both of the rollers 880 may provide one or more of the following benefits: providing a smoother external surface or crisper imprint; hastening the setting of the adhesive, and thus hastening the forming of the composite sheet material 815; improving the contact between the material 802 and the adhesive used to form the adhesive layer 820; and holding in place of the fibers comprising the pile of the material 802. Heating the rollers 880, 884 may aid in the penetration of the adhesive layer 820 into the interstitial spaces or gaps within the material 802 as the adhesive layer 820 passes beneath the rollers 880, 884 and may permit for better imprinting into, or smoothing of, the external surface of the adhesive layer 820.

Either or both rollers 880, 884 may also be operated without heating or cooling.

The diameter of each of the rollers 880, 881, and whether each of them are heated, or cooled, or neither heated nor cooled, depends upon the specific function desired for the roller. Such variations are within the scope of the present invention.

Figure 8:
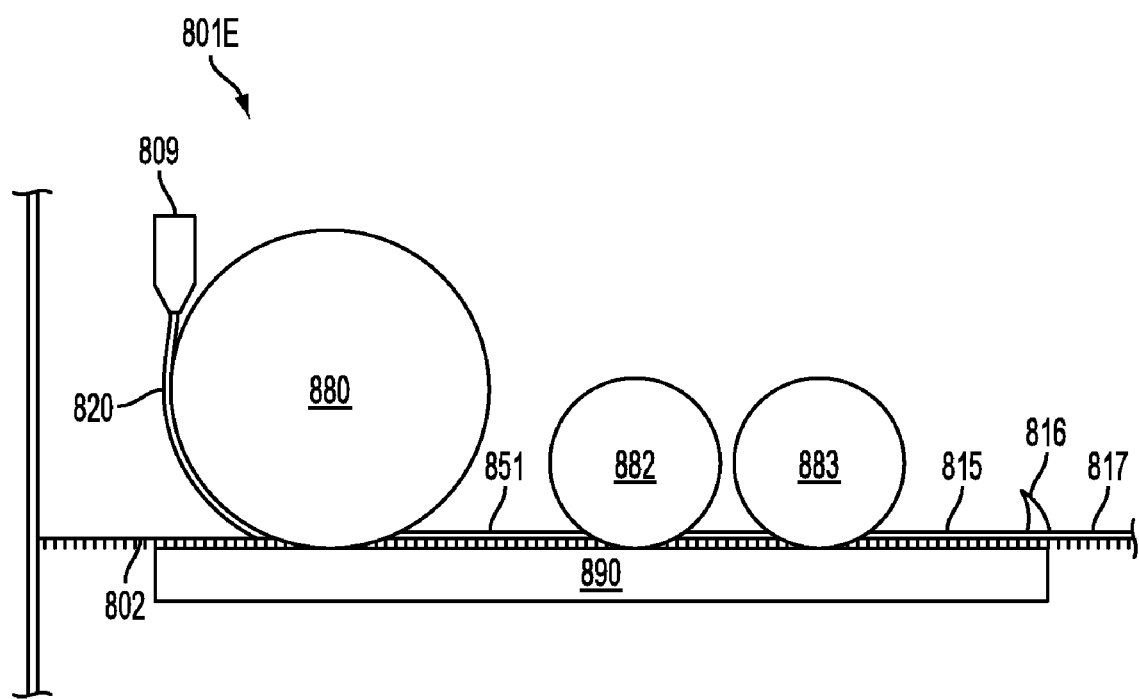
FIG. 8 is a side view diagrammatic representation of a still further apparatus for making composite cover material in accordance with an embodiment of the present invention.

FIG. 8 shows an apparatus 801E for forming the composite cover material 817. In an embodiment, the apparatus comprises an adhesive applicator 809 fed from a feeder (not shown) which gets a supply of adhesive from an adhesive supply (not shown). An advancing material 802 runs between rollers 880, 882, 883 and a surface 890 such as a flat portion of a tenter frame. The rollers 880, 882, 883 may be urged toward the surface 890 by a spring, by gravity or by other means that will be apparent to persons skilled in the art.

An adhesive layer 820 leaves the applicator 809 and falls upon the first roller 880. As the first roller 880 rotates, the adhesive layer 820 comes into contact with the material 802. The positioning of the applicator 809 may be varied. In an embodiment where the adhesive forming the adhesive layer 820 is polypropylene, the applicator 809 may be the die head of an extruder. In such an embodiment, the adhesive has a viscosity as it exits the extruder that forms a sheet of molten polypropylene. In an embodiment, the applicator 809 may be placed above the roller 880 such that it contacts the roller before the material 802 (as shown); or at another location where it will still make contact with the roller 880 before it contacts the material 802. Such variation is within the scope of this invention, and will be apparent to a person of skill in the art.

In an embodiment, the adhesive forming the adhesive layer 820 is polypropylene. As the material 802 and the adhesive layer 820 pass between the rollers 880, 882, 883 and the surface 890 they are urged together. As discussed above, each of the rollers 880, 882, 883 may be heated or cooled, or may be neither heated nor cooled. Also as discussed above, the rollers 880, 882, 883 may be of the same size, or of varying size. In an embodiment, the rollers 880 882, 883 are each in the range of 14" to 20". In an embodiment, the first roller 880 is in the range of 14" to 20", while the second and third rollers 882, 883 are smaller than the first roller 880, and are in the range of 10" to 18". Selection of the diameters and thermal characteristics of the rollers 880, 882, 883 may be to achieve desired results.

The composite sheet material 815 may be cut by cutter 816 to form the composite cover material 817 with a non-porous backing.

Figure 9:
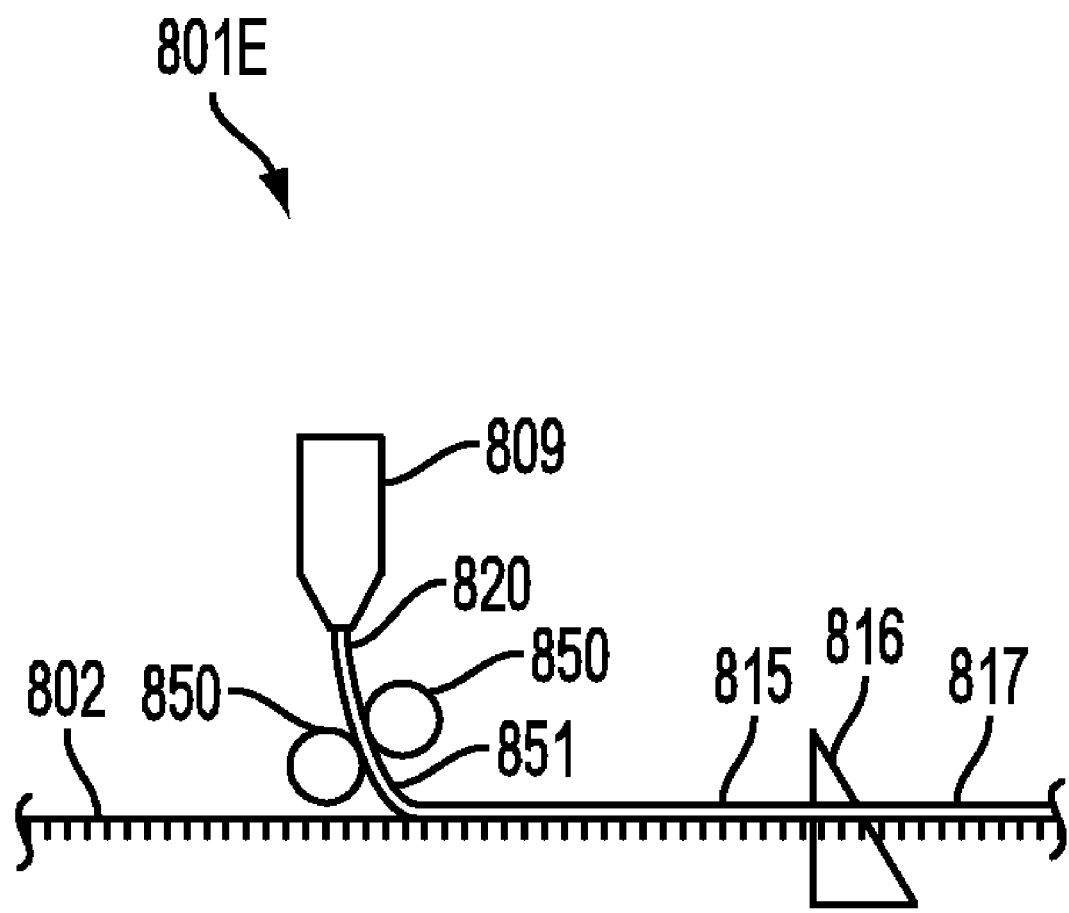
FIG. 9 is a side view diagrammatic representation of another further apparatus for making composite cover material in accordance with an embodiment of the present invention.

FIG. 9 shows an apparatus 801E for forming the composite cover material 817. In an embodiment, the apparatus comprises an adhesive applicator 809, a feeder and adhesive supply (not shown), rollers 850 and strip cutter 816. After the adhesive layer 820 leaves the applicator 809, but before it contacts the material 802, the rollers 850 smooth the adhesive layer 820 to form a smoothed adhesive layer 851. In an embodiment where the adhesive is polypropylene, although smoothed adhesive layer 851 may be cooler than it was leaving the applicator 809, it is still not hardened or set. Thus, after the smoothed adhesive layer 851 contacts the material 802, it can harden and set forming the composite sheet material 815. The composite sheet material 815 may be cut by cutter 816 to form the composite cover material 817 with a non-porous backing.

Figure 10:
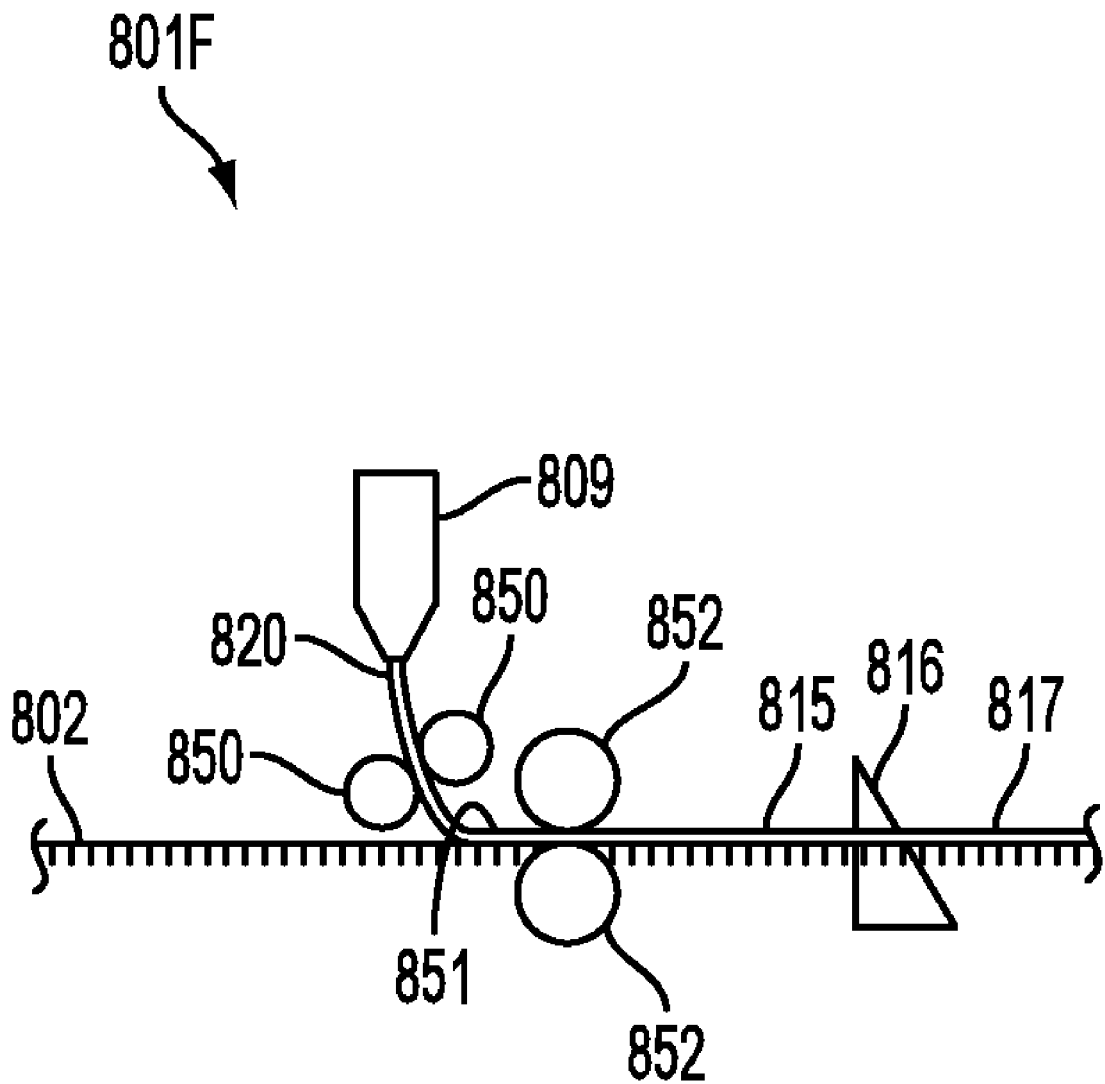
FIG. 10 is a side view diagrammatic representation of yet another further apparatus for making composite cover material in accordance with an embodiment of the present invention.

FIG. 10 shows an apparatus 801F for forming the composite cover material 817. In an embodiment, the apparatus comprises an adhesive applicator 809, a feeder and an adhesive supply (not shown), rollers 850, rollers 852 and strip cutter 816. After the adhesive layer 820 leaves the applicator 809, but before it contacts the material 802, the rollers 850 smooth the adhesive layer 820 to form a smoothed adhesive layer 851. In an embodiment where the adhesive is polypropylene, although smoothed adhesive layer 851 may be cooler than it was leaving applicator 809, it is still not hardened or set. After the smoothed adhesive layer 851 contacts the material 802, the rollers 852 apply a compressive force compressing the smoothed adhesive layer 851 and the material 802 together to form the composite sheet material 815. The rollers 852 may also be used to uniformly imprint the smoothed adhesive layer 851. The composite sheet material 815 may be cut by cutter 816 to form the composite cover material 817 with a non-porous backing.

In an embodiment, the rollers 852 are heated to a temperature hotter than the temperature of smoothed adhesive layer 851. In an embodiment, the rollers 852 are cooled to a temperature cooler than the temperature of the smoothed adhesive layer 851. In an embodiment, the rollers 852 are neither heated nor cooled. In an embodiment, one of the rollers 852 is heated while the other is cooled.

Figure 11:
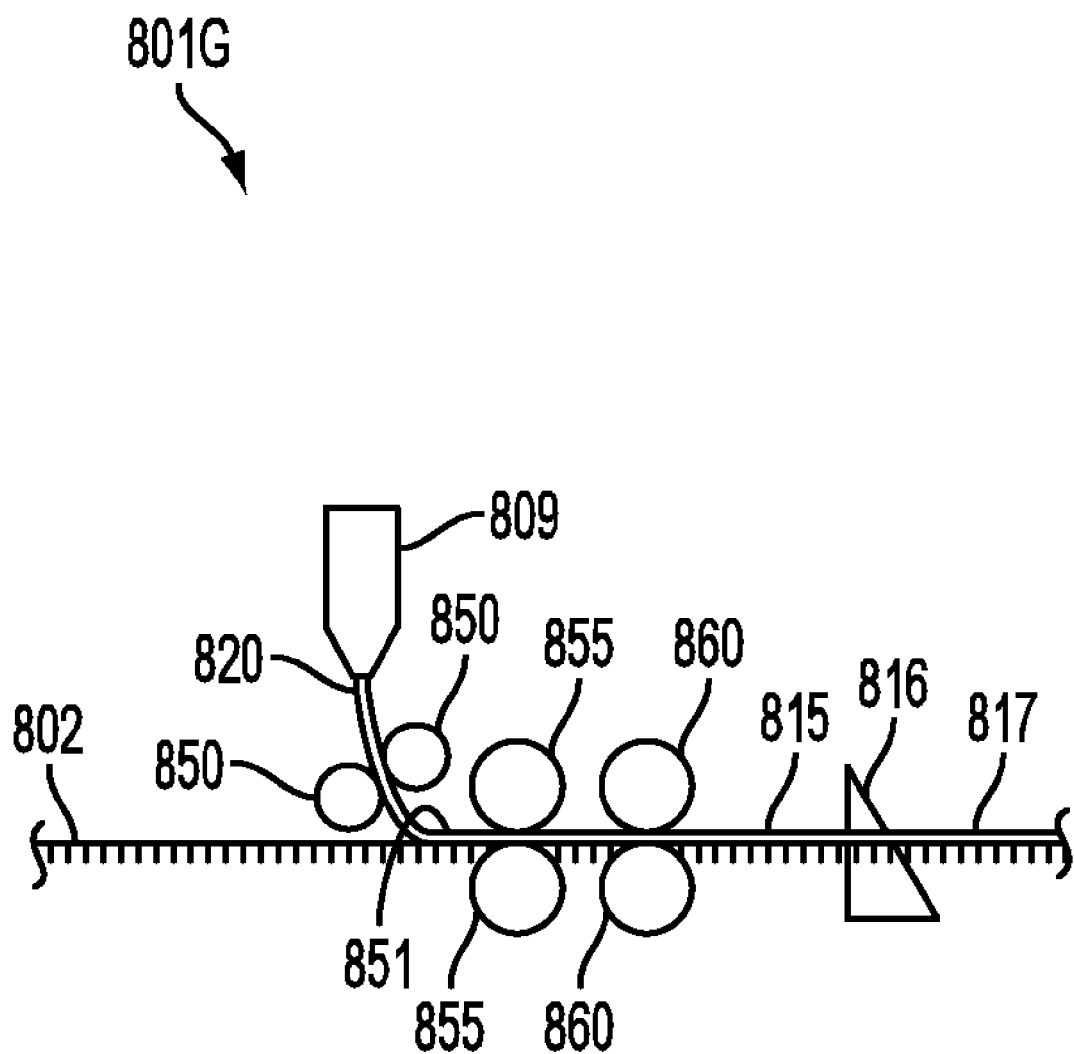
FIG. 11 is a side view diagrammatic representation of still another further apparatus for making composite cover material in accordance with an embodiment of the present invention.

FIG. 11 shows an apparatus 801G for forming the composite cover material 817. In an embodiment, the apparatus comprises an adhesive applicator 809, a feeder and an adhesive supply (not shown), three roller pairs 850, 855, 860 and strip cutter 816. After the adhesive layer 820 leaves the applicator 809, but before it contacts the material 802, the roller pair 850 may smooth the adhesive layer 820 to form a smoothed adhesive layer 851. In an embodiment the adhesive is predominantly polypropylene, and although smoothed adhesive layer 851 may be cooler than it was when leaving applicator 809, it is still not hardened or set. After the smoothed adhesive layer 851 contacts the material 802, the second roller pair 852 applies a compressive force compressing the smoothed adhesive layer 851 and the material 802 together while at the same time imparting heat to the combination. The third roller pair 860 thereafter applies a compressive force compressing the smoothed adhesive layer 851 and the material 802 together, while it may, at the same time, cool them. It is believed that the heating by rollers 852 may aid in filling fill interstitial spaces or gaps within the material 802 with contacting side of the smoothed adhesive layer 851, and that the cooling by the second cooling rollers 860 may hasten the setting of the smoothed adhesive layer. The resulting composite sheet material 815 may be cut by cutter 816 to form the composite cover material 817 with a non-porous backing.

Figure 12:
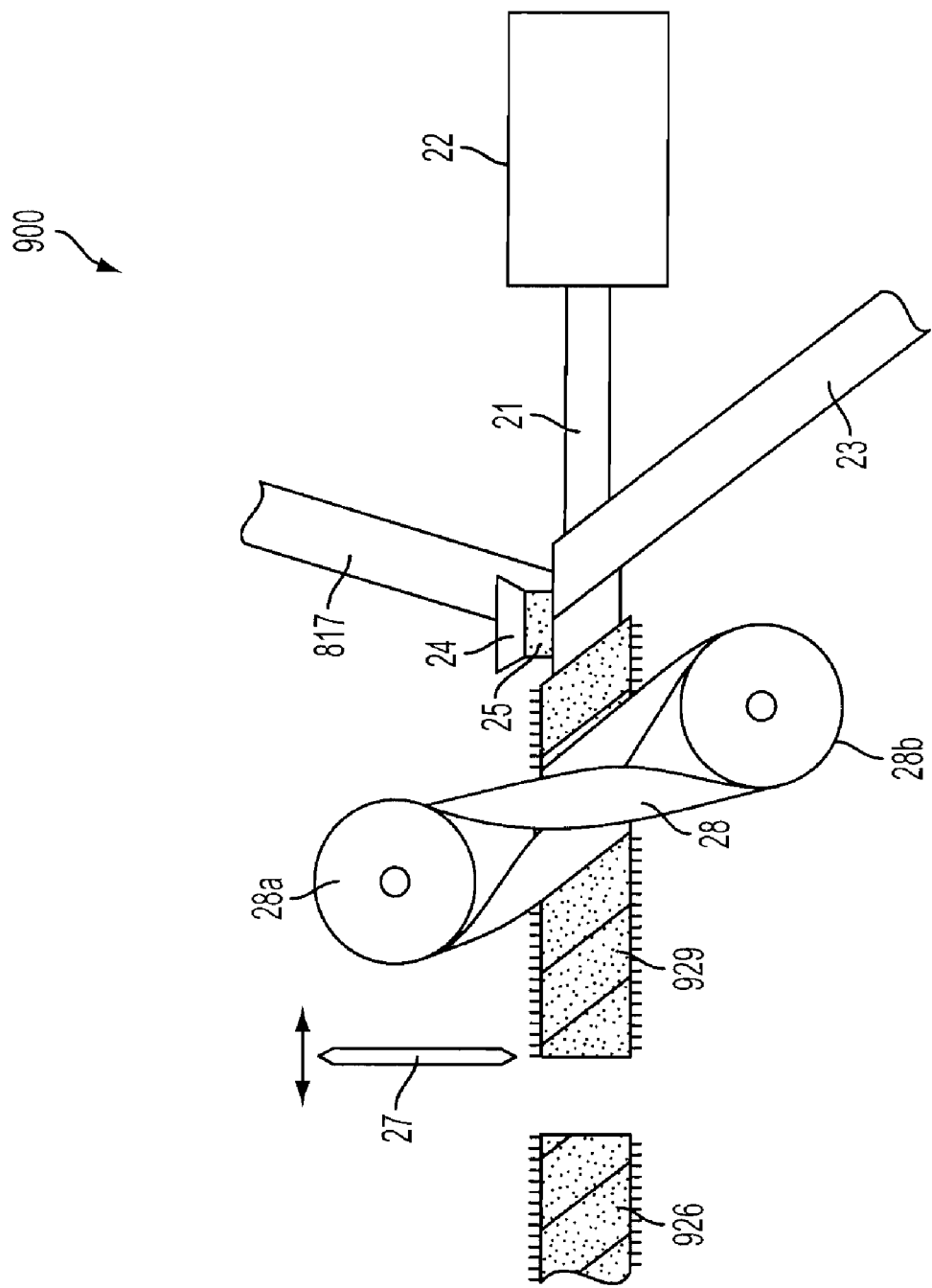
FIG. 12 is a diagrammatic representation of an apparatus for making laminated paint rollers using a composite cover material in accordance with an embodiment of the present invention.

FIG. 12 shows a diagrammatic representation of an apparatus 900 suitable for making laminated paint rollers in accordance with an embodiment of the invention. For ease of discussion in this application, the term "downstream" refers to the direction further along in the roller manufacturing process, or nearer the fly-away cutter 27, while the term "upstream" refers to the direction earlier in the roller manufacturing process, or further from the fly-away cutter 27.

Housing 22 supports mandrel 21. A cooler (not shown) can be used to cool the mandrel 21. In an embodiment, inner strip 23 is feed about a the mandrel 21, so it winds helically. The term helically as used herein means oriented about a mandrel 21 so as to permit the upstream edge of a given wind of a strip or cover material to be in closely-spaced or abutting relation with the downstream edge of the preceding wind of the strip. A lubricant such as 5% mineral oil may be applied to the inner surface of the inner strip 23 prior to winding on the mandrel 21.

The head 24 provides a layer of adhesive material 25 from a source of such material (not shown), the adhesive material 25 may be polypropylene or a compound predominantly made of polypropylene. The source of adhesive material 25 may be an extruder, or may be another source of adhesive material, such as a melter. The head 24 may be any type of head appropriate for providing adhesive material 25 from the source, such as a nozzle or a die. Where the source of polypropylene adhesive material 25 is an extruder, the head 24 is preferably a die.

In an embodiment a single head 24 supplies an adhesive layer 25 to the outer surface of inner strip 23 as it rotates around the mandrel 21. Although the width of the adhesive layer may be varied, in an embodiment, the width the adhesive layer 25 should substantially cover the outer surface of the inner strip 23. The width of the adhesive layer 25, however, may not completely cover the outer surface of the inner strip 23, or may be sufficient to excess adhesive over the amount required to completely cover the outer surface of inner strip 23. A strip of composite cover material 17 is advanced about the mandrel 21 outside of the inner strip 23 and adhesive layer 25. In an embodiment, composite cover material 817 comprises an outer surface of pile and a smooth or uniformly imprinted inner surface or backing made of polypropylene or a compound predominantly made of polypropylene.

The edges of the composite cover material 817 may be offset from the edges of the inner strip 23 as the two are advanced along the mandrel 21. It is believed that the a stronger product is yielded from having an offset between the edge of the composite cover material 817 and the edge of the inner strip 23. An offset of between about one-quarter and three-quarters of the width of the inner strip 23 is found to achieve acceptable results. Good results may be achieved by having an offset of about one-half of the width of the inner strip 23.

Prior to the hardening and setting of the adhesive material 25, an inwardly compressive force applies pressure to the outer pile surface of the composite cover material 817, imparting inward forces on the component parts, thus laminating the composite cover material 817 and the inner strip 23 as the adhesive layer 25 sets. The continuous roller 929 is thereby formed about the mandrel 21.

In an embodiment, the inwardly compressive force is a helical belt system formed from rollers 28a, 28b, and a belt 28. In addition to compressing the component parts and forming the roller, the belt 28 advances the thus-formed endless roller 929 along the mandrel 21 and continuously rotates the endless roller, thereby also advancing the inner strip 23 and the composite cover material 817 around and downstream on the mandrel 21.

The endless roller 929 may be cut by the fly-away saw 27, into lengths after it has sufficiently set. The fly-away saw 27 may be used to cut endless roller 929 into paint-roller sized lengths ready for finishing, or more typically into sticks 926 of a fixed length, such as 65", that may be further cut and finished into paint-rollers.

It is within the scope of the invention to apply the adhesive layer 25 to the outer surface of the inner strip 23, the inner smooth or imprinted surface of the composite cover material 817, or simultaneously to the smooth or imprinted inner surface of the composite cover material 817 and the outer surface of the inner strip 23, in any event, such that the adhesive layer 25 is sandwiched between the inner strip 23 and the composite cover material 817.

In an embodiment, the head 24 is a die head, and the adhesive layer 25 is predominantly or entirely from polypropylene. An extruder (not shown) forces the thermoplastic through the head 24, thereby dispensing a molten adhesive layer 25.

The present invention creates a laminated paint roller from a single strip of polypropylene 23 (or made predominantly of polypropylene), a single strip of composite cover material 817, and a single die head 24 that produces a layer of adhesive material 25 that is approximately as wide the width of the inner strip 23. The simple manufacturing line produces a laminated paint roller, with a low hoop force, which does not suffer from being out of round at its ends after being finished and cut. The lower hoop force can be demonstrated by slicing the a finished laminated paint roller lengthwise, and observing that it does not tend to open flat, but rather tends to keep its round shape as would an extruded plastic tube.

In an embodiment: the inner strip 23 has a width of 2¾ inches, and a thickness of between about 0.010" and 0.030"; the composite cover material 817 has approximately the same thickness, not counting the pile height, and a width of 2⅞ inches; and the adhesive layer may be between 0.010 inches and 0.030 inches. Thicknesses selected from the higher values in these ranges will provide paint rollers that have a more rigid feel, while thicknesses selected from the lower values in the ranges will provide a paint roller that has a softer feel. It is within the scope of the invention to independently select each of the thicknesses from these ranges. The width and thickness of the inner strip 23, and the width, non-pile thickness and pile thickness of the composite cover material 817 may be those that are appropriate for manufacture of the desired roller. For example, a typical high quality laminated roller having a 1.5-inch diameter core and a 75-wall can be manufactured with the following materials:

|  | Width | Non-pile Thickness | Pile Thickness |
| --- | --- | --- | --- |
| Inner Strip | 2.750" | 0.025" | N/A |
| Adhesive Layer | 2.750" | 0.020" | N/A |
| Composite cover material | 2.875" | 0.015" | Desired Pile |

As used herein, the term "wall" or "mil" means thickness in thousandths of an inch. Such widths and thickness and the methods of determining them will be apparent to one of skill in the art; almost infinite variation is possible depending upon the characteristics of the desired roller.

It is presently believed that the lamination process of the present invention will produce commercially acceptable rollers having a 1.5-inch diameter core manufactured with any of the following combinations of materials:

|  | Width | Non-pile Thickness | Pile Thickness |
|---|---|---|---|
| Inner Strip | 2.750" | 0.005" | N/A |
| Adhesive Layer | 2.750" | 0.010" | N/A |
| Composite cover material | 2.875" | 0.005" | Desired Pile | or

|  | Width | Non-pile Thickness | Pile Thickness |
|---|---|---|---|
| Inner Strip | 2.750" | 0.010" | N/A |
| Adhesive Layer | 2.750" | 0.020" | N/A |
| Composite cover material | 2.875" | 0.015" | Desired Pile | or

|  | Width | Non-pile Thickness | Pile Thickness |
|---|---|---|---|
| Inner Strip | 2.750" | 0.015" | N/A |
| Adhesive Layer | 2.750" | 0.015" | N/A |
| Composite cover material | 2.875" | 0.010" | Desired Pile |

Variations of this type with respect to the present invention will be apparent to one skilled in the art. The amount of adhesive required is expected to be less than may be required in a process bonding a polypropylene strip to cover material such as material 802 (FIG. 1, et seq.) This is expected because the adhesive layer bonds only two smooth (or uniform) non-porous layers rather than a smooth layer with a porous material.

In another embodiment (not shown), the composite cover material 817 can be directly fed from a machine producing it (e.g., the apparatus 801B in FIG. 4) into a paint roller manufacturing apparatus 900 for making laminated paint rollers. It is within the scope of the invention to combine multiple composite cover material 817 strips, such as, for example, using a fly-away to cutter to cut the composite cover material 817 into fixed-length sections, and using a fastening means to attach the ends of such fixed-length sections as the composite cover material 817 is consumed by the manufacturing of paint rollers using a paint roller manufacturing apparatus 900. In this manner, depending on the relative speed of the paint roller manufacturing apparatus 900, the machine producing the composite cover sheet 815 (see FIG. 4), the manufactured width of composite cover sheet 815 (see FIG. 4) and the desired width of composite cover material 817 (see FIG. 4), multiple paint roller manufacturing apparati 900 can be supplied from one apparatus 801B making composite cover material 817.

Figure 13:
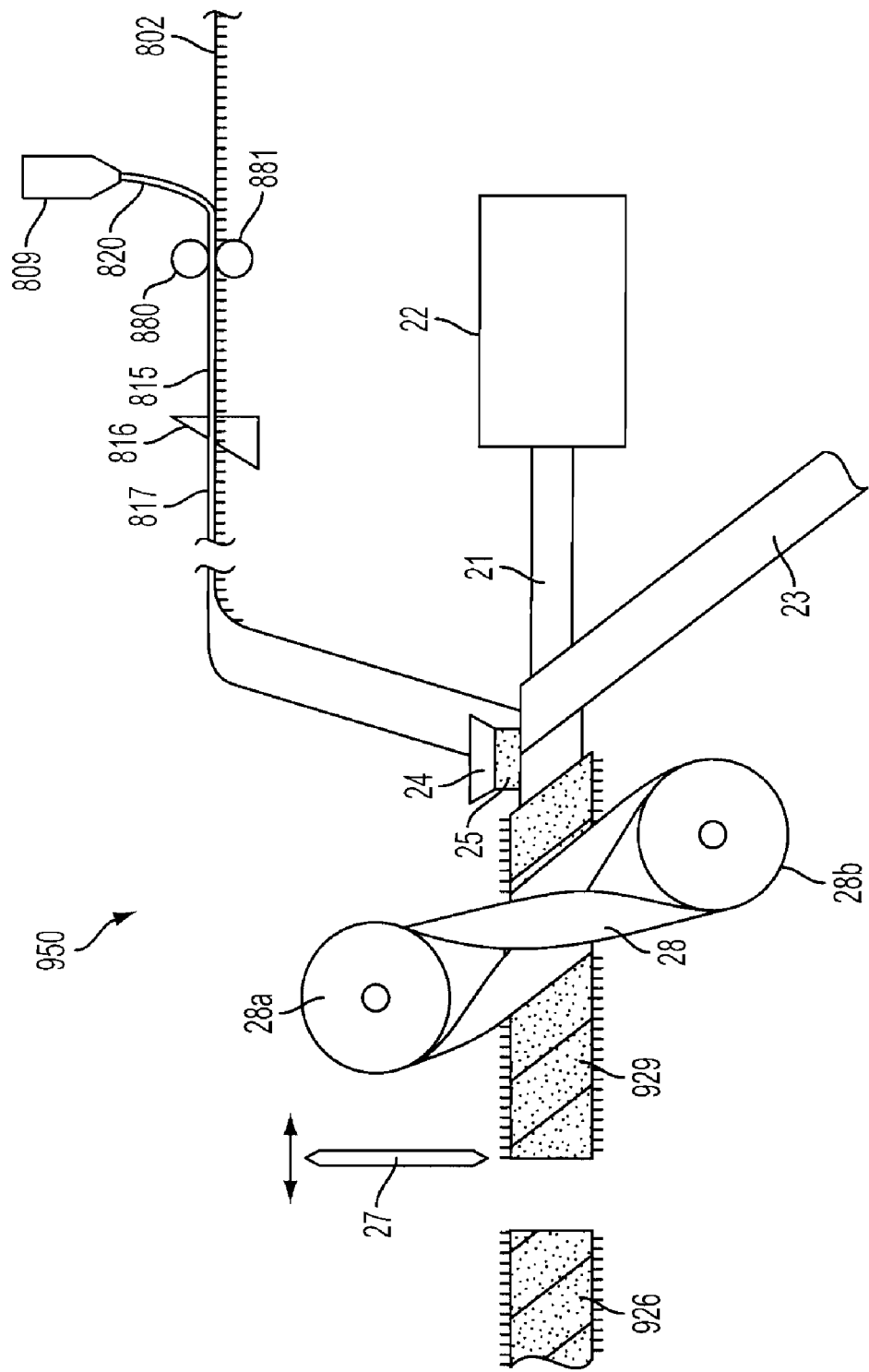
FIG. 13 is a diagrammatic representation of another apparatus for making laminated paint rollers using a composite cover material in accordance with an embodiment of the present invention.

FIG. 13 shows a diagrammatic representation of an apparatus 950 suitable for making laminated paint rollers in accordance with an embodiment of the invention. In an embodiment, the apparatus comprises a first adhesive applicator 809 having a feeder and an adhesive supply (not shown), rollers 880, 880 and a cutter 816. The composite cover material 817 is formed using a supply of pile material 802, having a pile side and a fabric side, and suitable for use manufacturing a paint roller cover. The pile material 802 is laid flat for processing. The material 802 may be sheared (not shown) on the pile side to attain a desired pile height prior to processing by the machine 950. The material 802 can be in any convenient width. In an embodiment, material 802 has a width of approximately 32".

In an embodiment, an adhesive layer 820 is applied to the fabric side of the material 802 by the adhesive applicator 809. The adhesive supply (not shown) supplies the adhesive to the applicator 809 by a feeder (not shown). In an embodiment, the adhesive is made predominantly or entirely from polypropylene resin, the adhesive applicator may be an extruder comprising a die head 809.

After the adhesive layer 820 is applied to the fabric side of the material 802, a compressive force urging the adhesive layer and the material 802 together is imparted by rollers 880, 881. The upper roller 880 smoothes and/or imprints the exterior surface of the adhesive layer forming a smoothed or imprinted layer 851. The thus-formed composite sheet material is then permitted to cool and set. Such cooling and setting can be hastened by a cooling system (not shown) which can impart cooling to the combined sheet material 815 by any method, including, without limitation, a cooled roller or the flow of cool air or other gas or fluids. In an embodiment, the adhesive layer 820 comprises predominantly or entirely polypropylene. The fibers in the material 802 are further held in place by the adhesive layer 820 after it has cooled and set.

Either before or after the applied adhesive layer 820 is completely set, the composite sheet material 815 is advanced toward a cutter 816. The cutter 816 is used to cut the composite sheet material into strips of composite cover material 817 having a pile side and a smooth and/or imprinted side predominantly or entirely made of polypropylene. In an embodiment, the strips of composite cover material are each approximately 2⅞ inches wide corresponding to a width of a cover strip that may be then used to manufacture paint rollers.

In an embodiment, eleven strips of composite cover material 817 each being 2⅞ inches wide are formed from a width of approximately 32" of the material 802. This width allows for a relatively small amount of waste on each side of the composite sheet material 815 as it is cut by the cutter 816 and thereby becomes composite cover material 817.

Although the composite cover material 815, or the strips of composite cover material 817 could be spooled and cut (not shown) for transportation to another site or another machine performing a manufacturing process for laminated paint rollers in accordance with the present invention, in an embodiment, the composite cover material 817 is fed directly to a mandrel 21. Housing 22 supports the mandrel 21. A cooler (not shown) can be used to cool the mandrel 21. In an embodiment, an inner strip 23 is made from or predominantly made from polypropylene. The inner strip 23 is feed about a the mandrel 21 so it winds helically.

The head 24 provides a layer of adhesive material 25 from a source of such material (not shown). The layer of adhesive material 25 is preferably polypropylene or made predominately from polypropylene. The polypropylene material is preferably supplied by an extruder (not shown) to head 24 that is a die.

In an embodiment a single head 24 dispenses a layer of adhesive material 25 to the outer surface of inner strip 23 as it rotates around the mandrel 21. Although the width of the layer of adhesive material may be varied, in an embodiment, the width the layer of adhesive material 25 should substantially cover the outer surface of the inner strip 21. The width of the layer of adhesive material 25, however, may not completely cover the outer surface of the inner strip 21, or may in an embodiment be sufficient to provide excess adhesive over the amount required to completely cover the outer surface of inner strip 21. The strip of composite cover material 817 is advanced from the cutter 816 toward, and then about the second mandrel 21 outside of the inner strip 23 and the layer of adhesive material 25.

The edges of the composite cover material 817 may be offset from the edges of the inner strip 23 as the two are advanced along the mandrel 21. It is believed that the a stronger product is yielded from having an offset between the edge of the composite cover material 817 and the edge of the inner strip 23. An offset of between about one-quarter (as shown) and three-quarters of the width of the inner strip 23 is found to achieve acceptable results. Good results are achieved by having an offset of about one-half of the width of the inner strip 23.

Prior to the hardening and setting of the layer of adhesive material 25, an inwardly compressive force applies pressure to the outer surface of the composite cover material 817, imparting inward forces on the component parts, thus laminating the composite cover material 817 and the inner strip 21 as the adhesive layer 25 sets. The continuous roller 929 is thereby formed about the mandrel 21.

In an embodiment, the inwardly compressive force is a helical belt system formed from rollers 28a, 28b, and a belt 28. In addition to compressing the component parts and forming the roller, the belt 28 advances the thus-formed endless roller 929 along the mandrel 21 and continuously rotates the endless roller, thereby also advancing the inner strip 23 and the composite cover material 817 around and downstream on the mandrel 817.

The endless roller 929 may be cut by the fly-away saw 27, into lengths after it has sufficiently set. The fly-away saw 27 may be used to cut endless roller 929 into paint-roller sized lengths ready for finishing, or more typically into sticks 926 of a fixed length, such as 65", that may be further cut and finished into paint-rollers.

It is within the scope of the invention to apply the adhesive layer 25 to the outer surface of the inner strip 23 (shown), the inner surface of the composite cover material 817 not shown, or simultaneously to the inner surface of the composite cover material 817 and the outer surface of the inner strip 23, in any event, such that the adhesive layer 25 is sandwiched between the inner strip 23 and the composite cover material 817.

Figure 14:
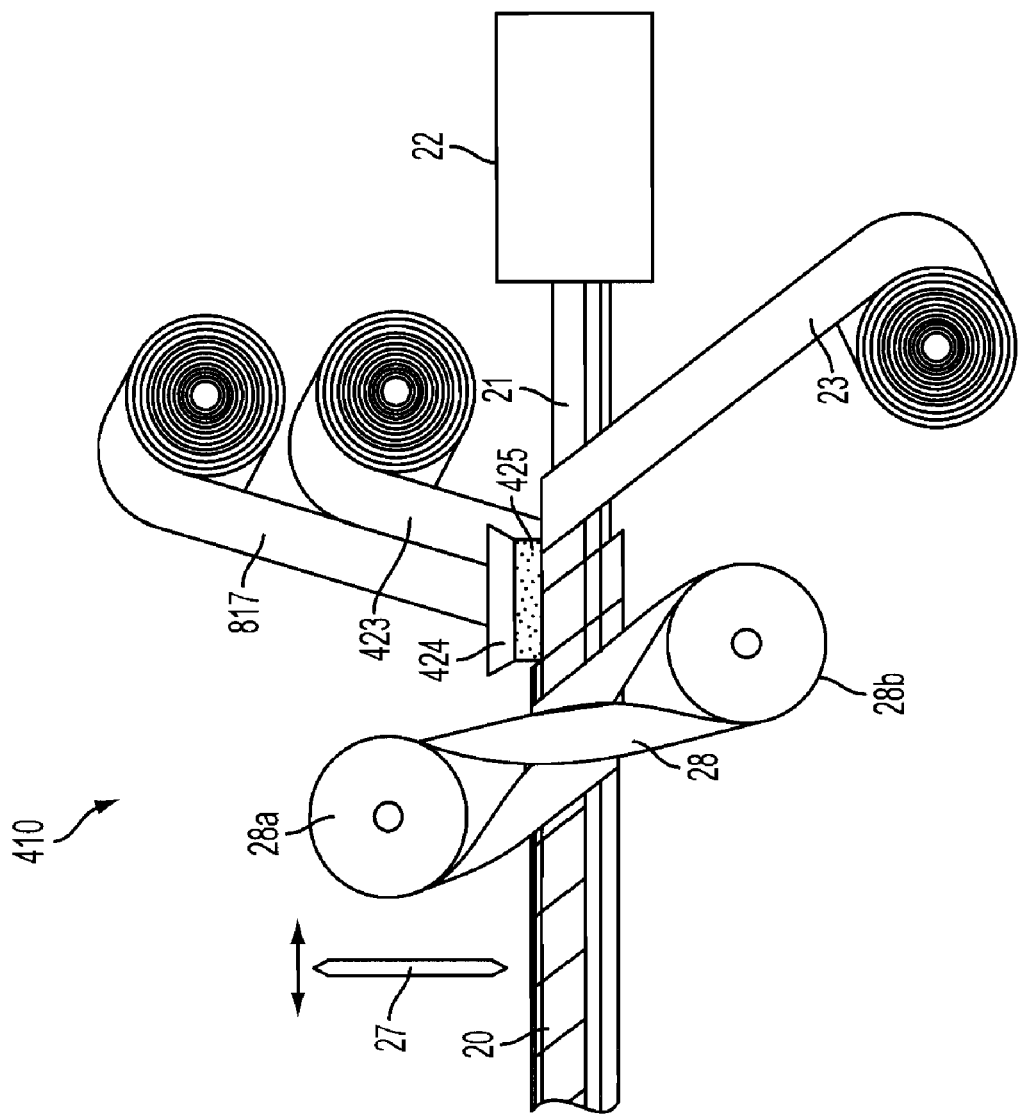
FIG. 14 is a diagrammatic representation of an apparatus suitable for making multi-strip laminated paint rollers using a composite cover material in accordance with an embodiment of the present invention.

FIG. 14 shows a diagrammatic representation of an apparatus 410 suitable for making laminated paint rollers in accordance with another embodiment of the invention. Housing 22 supports mandrel 21. A cooler (not shown) can be used to cool the mandrel 21. In an embodiment, inner strip 23 is feed about a the mandrel 21, so it winds helically. A lubricant such as 5% mineral oil may be applied to the inner surface of the inner strip 23 prior to winding on the mandrel 21. Second strip 423 is feed about a the mandrel 21 and inner strip 23, so it winds helically, and in offset relation to inner strip 23.

The head 424 provides a layer of adhesive material 425 from a source of such material (not shown), the adhesive material 425 preferably is or comprises predominately polypropylene. The source of adhesive material 425 is preferably an extruder, but may be any source of adhesive material including a melter. The head 424 may be any type of head appropriate for providing adhesive material 425 from the source, such as a nozzle or a die. Where the source of the adhesive material 425 is an extruder, the head 424 is preferably a die.

In an embodiment a single head 424 supplies an adhesive layer 425 to the outer surface of portions of two adjacent winds of inner strip 23 and to all or substantially all of one wind of second strip 423 as they rotate (helically) around the mandrel 21. The width of the adhesive layer may be varied, thus, in an embodiment, the width the adhesive layer 425 should substantially cover the outer surface of the second strip 423 and should cover approximately the same width on the outer surface of inner strip 23, albeit on two adjacent winds of inner strip 23. The width of the adhesive layer 425, however, may be insufficient to cover, or may result in some excess adhesive over the amount required to completely cover the outer surfaces of the strips 23, 423 as discussed. A strip of composite cover material 817 having a non-porous backing is advanced about the mandrel 21 outside of the second strip 423 and adhesive layer 425. In an embodiment, the generally non-porous backing of the composite cover material is made of, or made predominantly of, polypropylene. In an embodiment, the backing of the composite cover material 817 the may be generally smooth or may have a uniform imprint thereon.

The edges of the composite cover material 817 may be offset from the edges of the second strip 423 as they are advanced (helically) along the mandrel 21. It is believed that the a stronger product is yielded from having an offset between the edges of the non-porous layers, i.e., the composite cover material 817, the inner strip 23 and the second strip 423. An offset of between about one-quarter and three-quarters of the width of the inner strip 23 is found to achieve acceptable results. Good results can be achieved by having an offset of about one-third of the width of the inner strip 23 between each of the aforementioned non-porous layers.

Prior to the hardening and setting of the adhesive material 425, an inwardly compressive force applies pressure to the outer surface of the composite cover material 817, imparting inward forces on the component parts, thus laminating the composite cover material 817, the second strip 243 and the inner strip 23 as the adhesive layer 425 sets. The continuous roller 20 is thereby formed about the mandrel 21.

In an embodiment, the inwardly compressive force is a helical belt system formed from rollers 28a, 28b, and a belt 28. In addition to compressing the component parts and forming the roller, the belt 28 advances the thus-formed endless roller 20 along the mandrel 21 and continuously rotates the endless roller, thereby also advancing the strips 23, 423 and the composite cover material 817 around and downstream on the mandrel 21.

The endless roller 20 may be cut by the fly-away saw 27, into lengths after it has sufficiently set. The fly-away saw 27 may be used to cut endless roller 20 into paint-roller sized lengths ready for finishing, or more typically into sticks of a fixed length, such as 65", that may be further cut and finished into paint-rollers.

It is possible, without departing from the invention, to use more than one head to deposit the layer of adhesive material 25 between the composite cover material 817 and the second strip 423, and between the second strip 423 and the inner strip 23. Regardless of the width or number of heads, in order to produce a quality laminated continuous roller, pressure must be applied inwardly upon the composite cover material 817 before the layer of polypropylene is permitted to harden and set.

A benefit of certain embodiments of the instant invention is that a laminated roller can be produced using a narrow head and one strip and a composite cover material with a non-porous backing, and more specifically, with one non-porous polypropylene strip and one strip of a composite cover material having a non-porous backing. It is expected that such a process will be easy and cost efficient to operate, and will likely be able to produce rollers quickly. Another benefit of certain embodiments of the present invention is that it can create a laminated paint roller using a narrow head and one strip and a composite cover material with a non-porous backing without the rollers being out-of-round at its edges when they are finished and cut.

A benefit of certain embodiments of the instant invention is that it can create a high quality laminated roller by using a single head, two thin strips of polypropylene and a composite cover material with a non-porous backing.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The above description and drawings are merely illustrative of the present invention and that changes in components, structure and procedure are possible without departing from the scope of the present invention as defined in the following claims.

What is claimed is:

1. A method of making a composite cover material having an outer surface comprising pile and a smooth non-porous inner surface, the cover material for use in a method of making a laminated paint roller comprising the steps of, helically winding a strip of polypropylene material around a mandrel so as to form a helically wound strip, the strip having an outer surface, advancing the wound strip along the mandrel, applying a layer of polypropylene adhesive onto an outer surface of the wound strip, wrapping a strip of cover material about the wound strip and over the layer of adhesive and applying compression from without the cover material to urge the cover material, the layer of adhesive and strip of polypropylene material together thereby laminating the cover material to the strip, the method of making a cover material comprising the steps of:

advancing a width of pile material having an underside and a pile side, underside up and pile side down, beneath a rotating roller;

depositing a layer of molten material, the molten material predominantly comprising polypropylene, on the rotating roller such that the layer of molten material comes in contact with and is compressed against the underside of the advancing width of pile material as the pile material passes beneath the rotating roller and before the layer of molten material has a chance to harden and set;

permitting the molten material to harden and set while in contact with the advancing width of pile material thereby forming a non-porous backed pile material; and cutting the non-porous backed pile material into strips of cover material.

2. The method of making a composite cover material according to claim 1, wherein the compressive force is applied to a top side of the layer of molten material before the layer hardens and sets, to smooth the top side of the layer, and to urge the layer of molten material and the pile material together, thereby forming the non-porous backed pile material with a smooth side and a pile side, and wherein the pile is held fast on the fabric and the fabric is stiffened for handling.

3. The method of making a composite cover material as claimed in claim 1, wherein the pile material is a knit material.

4. The method of making a composite cover material as claimed in claim 1, wherein the pile material is a woven material.

5. The method of making a composite cover material as claimed in claim 1, wherein the pile material is a microfiber material.

6. The method of making a composite cover material as claimed in claim 1, wherein the rotating roller is cooled such that the compressive force is applied by a cooled roller.

7. The method of making a composite cover material as claimed in claim 1, wherein the rotating roller is heated such that the compressive force is applied by a heated roller.

* * * * *